Jan. 21, 1941.　　　　E. S. HINELINE　　　　2,229,606
PHOTOGRAPHIC CAMERA HAVING SELF-CAPPING SHUTTER MECHANISM, ETC
Filed Dec. 3, 1938　　　14 Sheets-Sheet 2
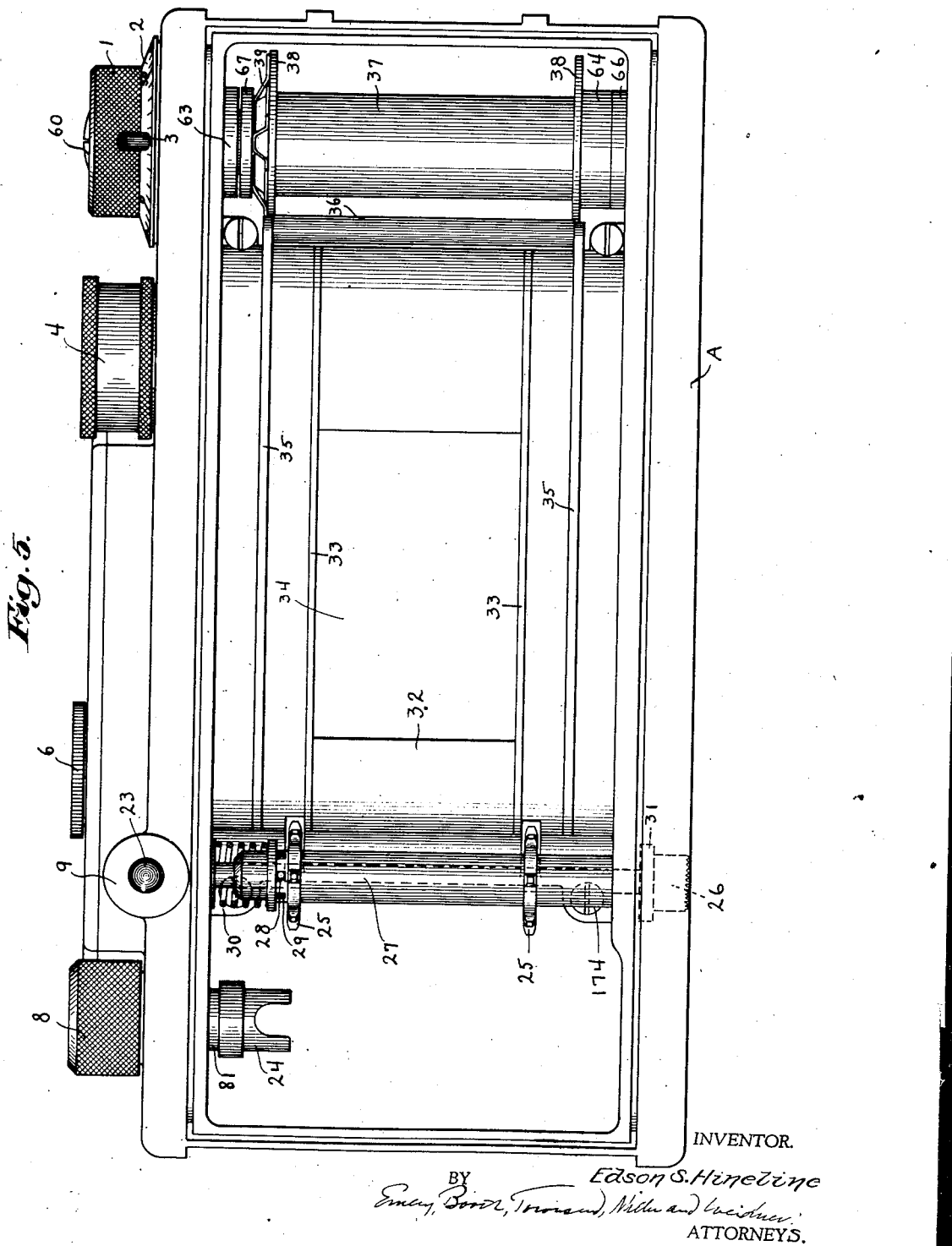
INVENTOR.
Edson S. Hineline
BY
Emery, Booth, Townsend, Miller and Weidner
ATTORNEYS.

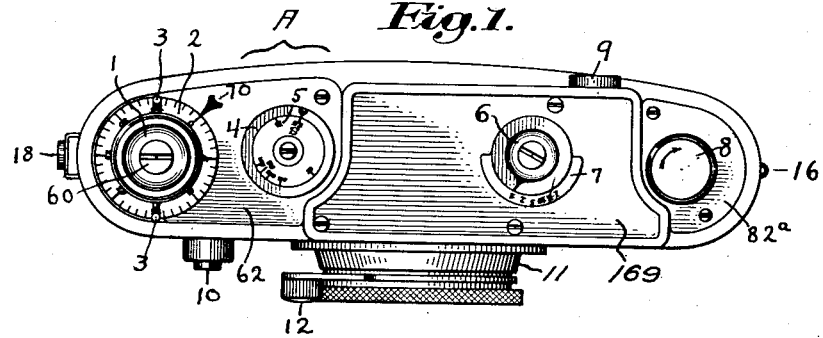

Jan. 21, 1941.  E. S. HINELINE  2,229,606
PHOTOGRAPHIC CAMERA HAVING SELF-CAPPING SHUTTER MECHANISM, ETC
Filed Dec. 3, 1938  14 Sheets-Sheet 3

INVENTOR.
Edison S. Hineline
by Emery, Booth, Townsend, Miller and Weidner
ATTORNEYS.

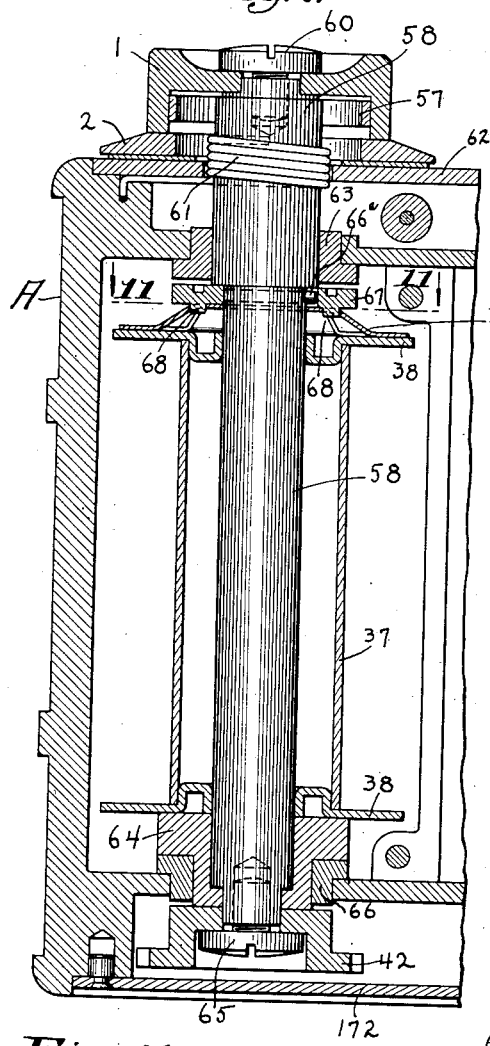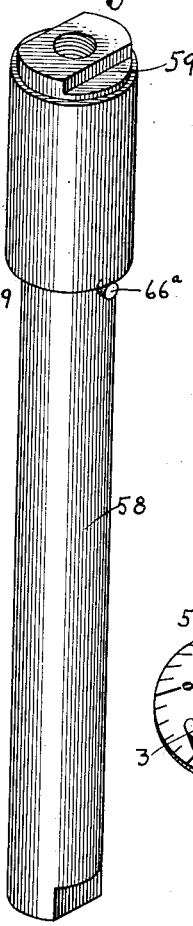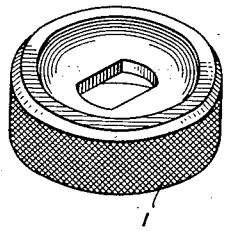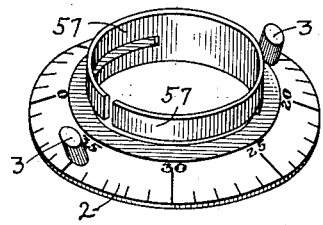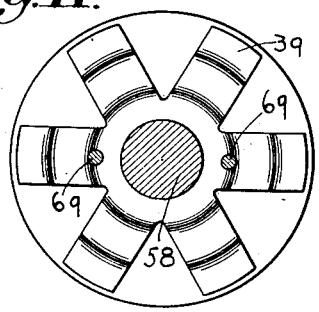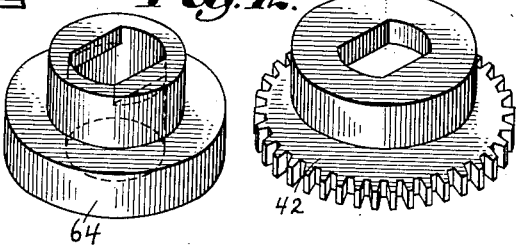

Jan. 21, 1941.   E. S. HINELINE   2,229,606
PHOTOGRAPHIC CAMERA HAVING SELF-CAPPING SHUTTER MECHANISM, ETC
Filed Dec. 3, 1938   14 Sheets-Sheet 5
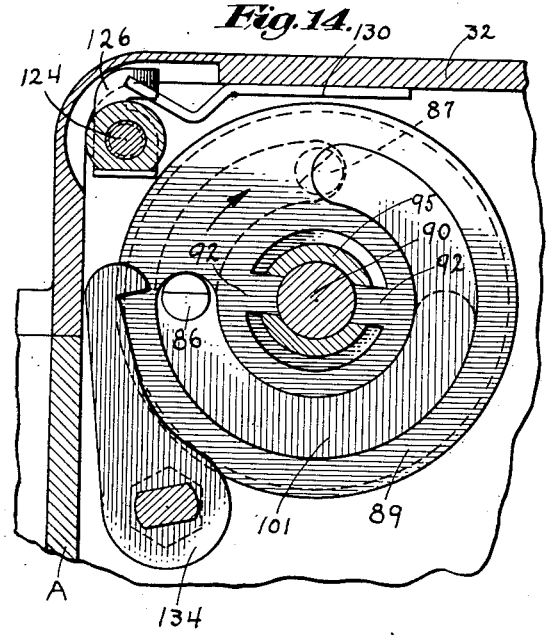
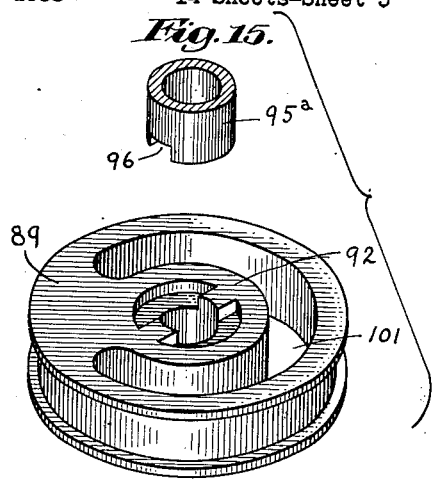
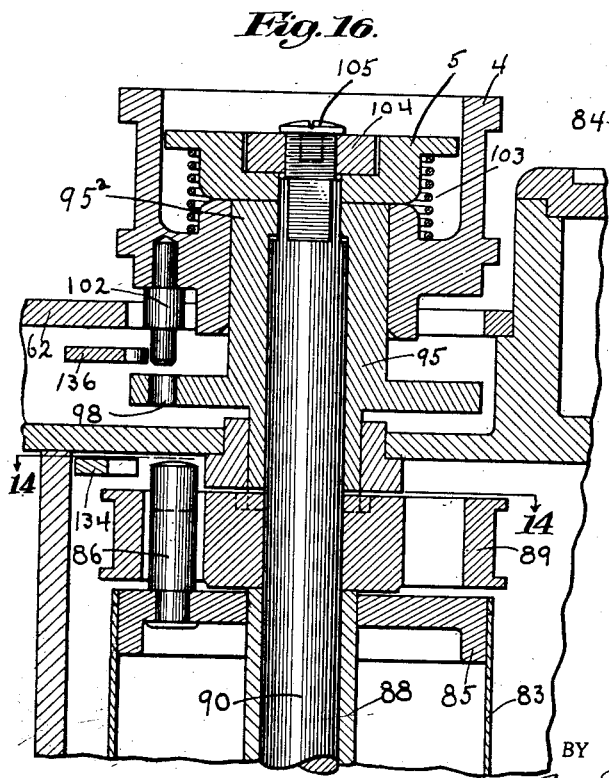
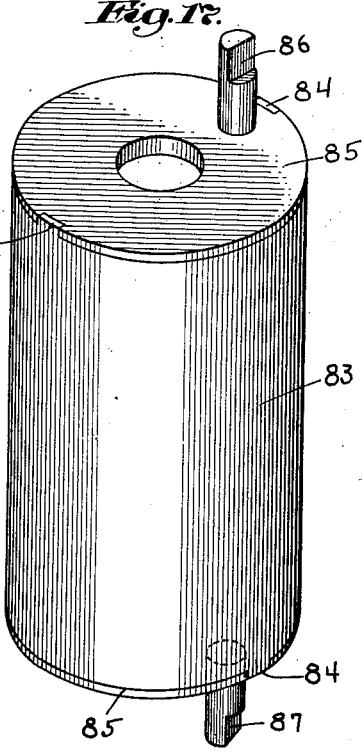
INVENTOR.
Edson S. Hineline
BY
ATTORNEYS.

Jan. 21, 1941.  E. S. HINELINE  2,229,606
PHOTOGRAPHIC CAMERA HAVING SELF-CAPPING SHUTTER MECHANISM, ETC
Filed Dec. 3, 1938  14 Sheets-Sheet 6
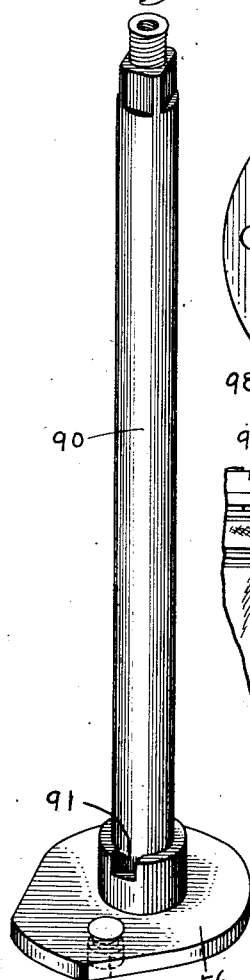
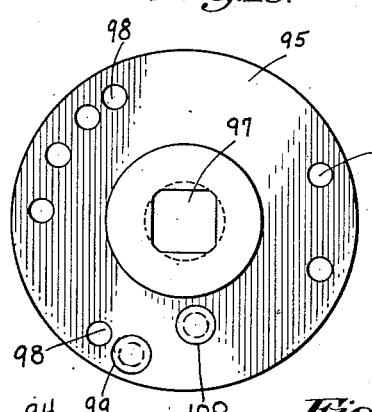
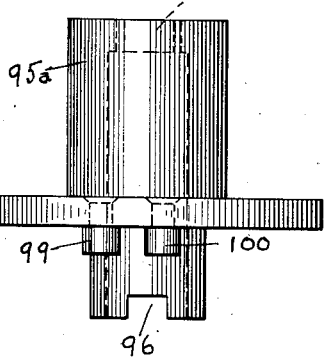
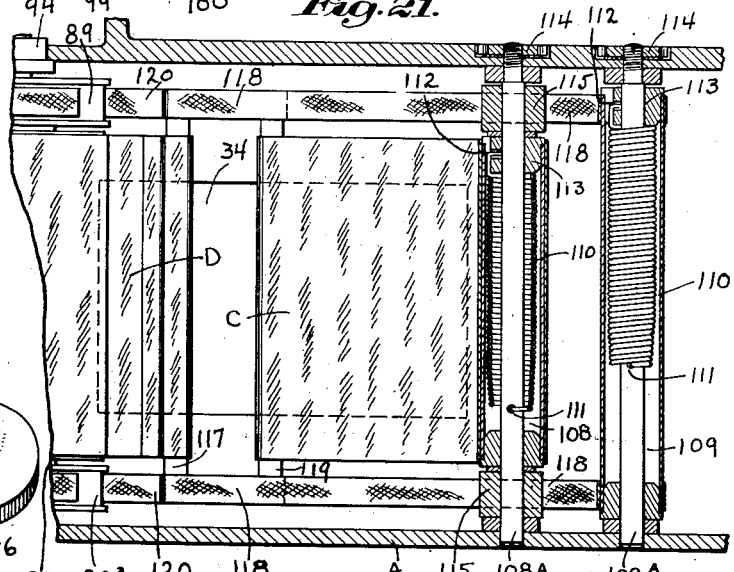
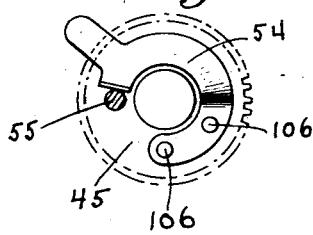
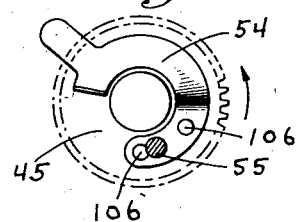
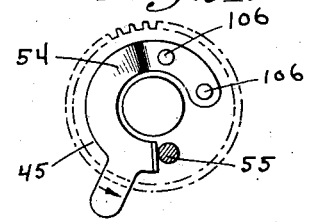
INVENTOR.
Edson S. Hineline
BY
ATTORNEYS.

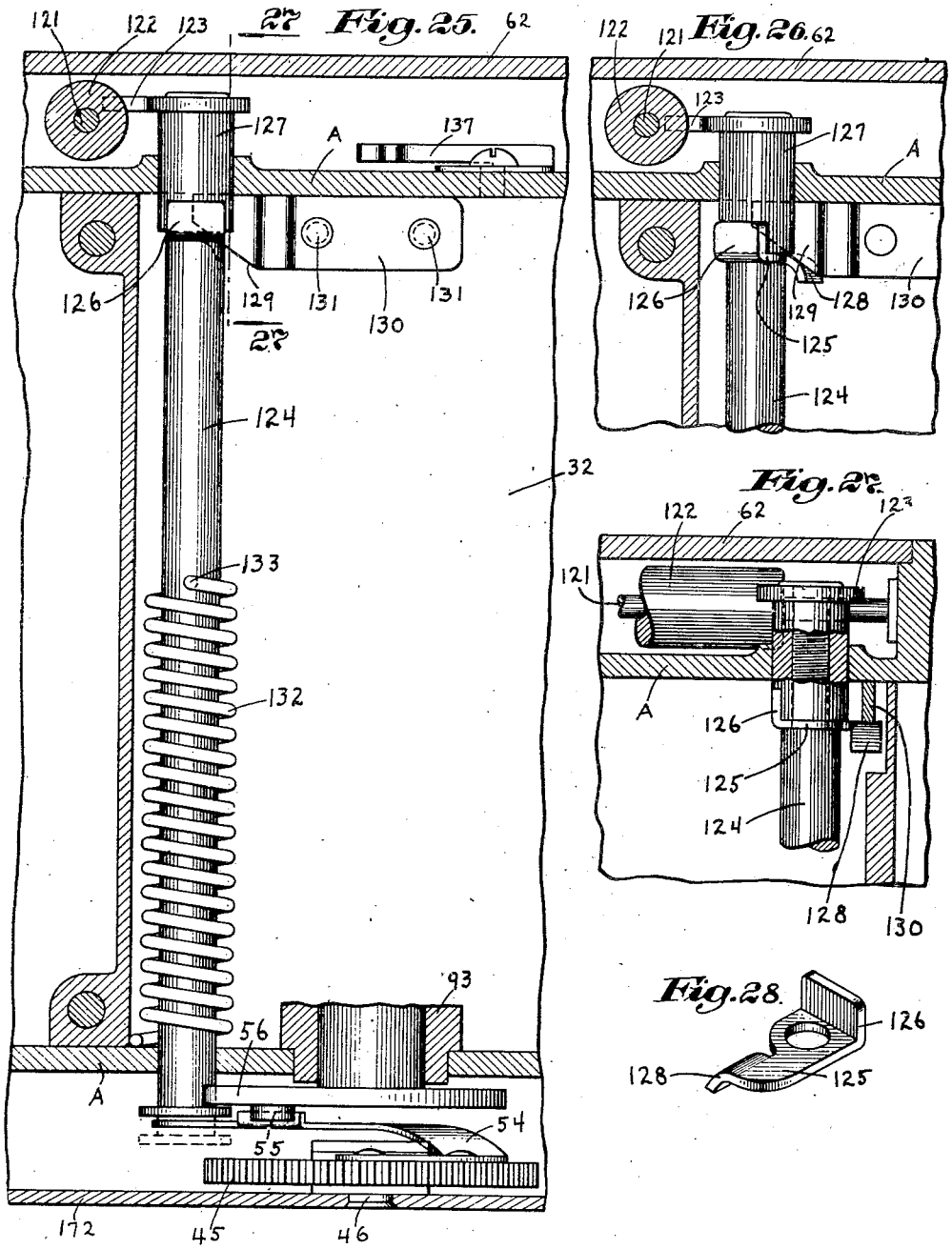

Jan. 21, 1941.  E. S. HINELINE  2,229,606
PHOTOGRAPHIC CAMERA HAVING SELF-CAPPING SHUTTER MECHANISM, ETC
Filed Dec. 3, 1938  14 Sheets-Sheet 8
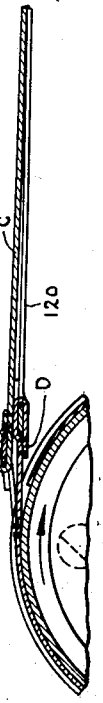
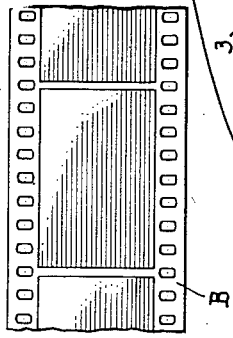
INVENTOR.
Edson S. Hineline
BY
ATTORNEYS.

Jan. 21, 1941.   E. S. HINELINE   2,229,606
PHOTOGRAPHIC CAMERA HAVING SELF-CAPPING SHUTTER MECHANISM, ETC
Filed Dec. 3, 1938   14 Sheets-Sheet 9
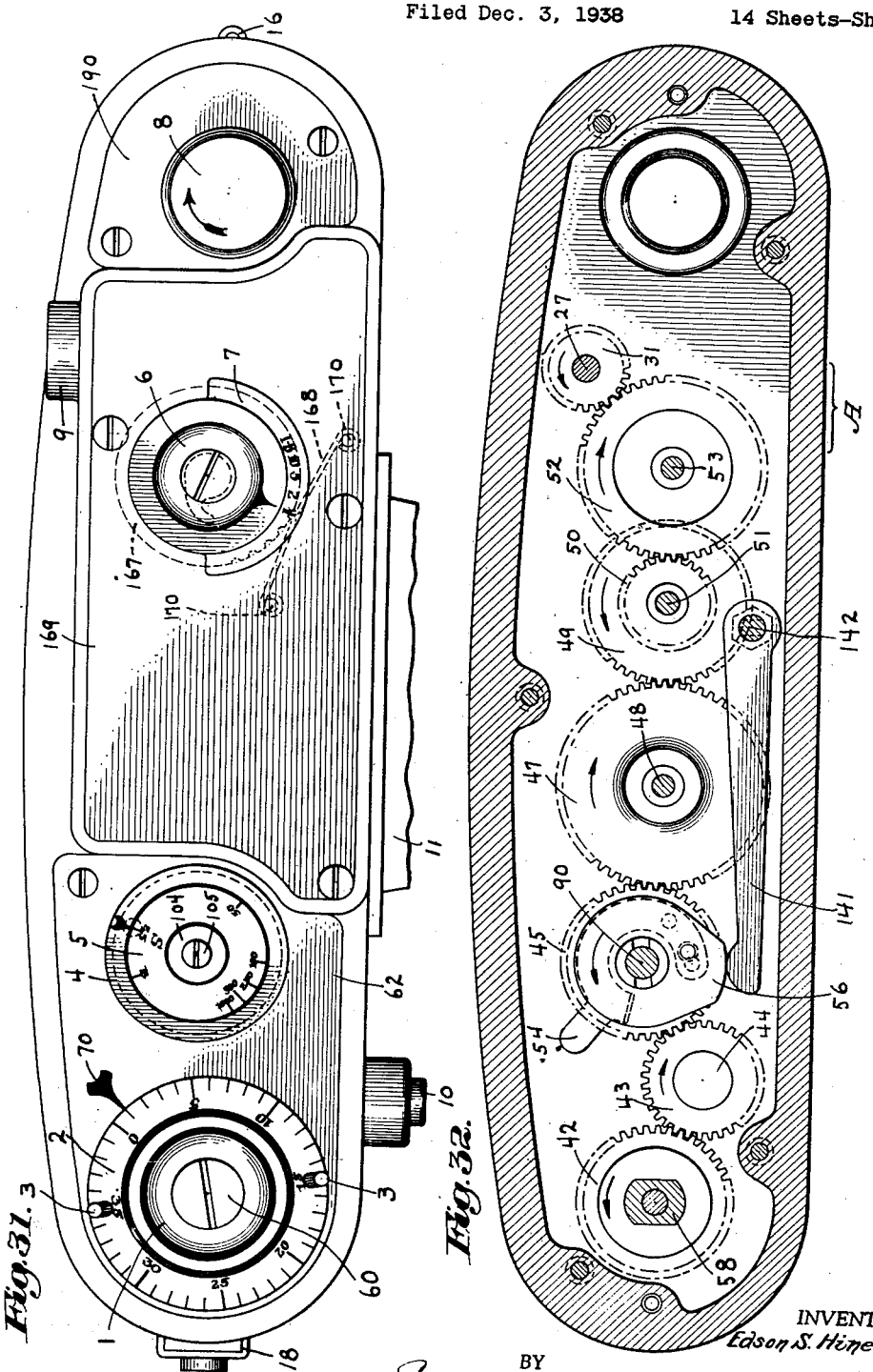
INVENTOR.
Edson S. Hineline,
BY
ATTORNEYS.

Jan. 21, 1941.　　　E. S. HINELINE　　　2,229,606
PHOTOGRAPHIC CAMERA HAVING SELF-CAPPING SHUTTER MECHANISM, ETC
Filed Dec. 3, 1938　　　14 Sheets-Sheet 10
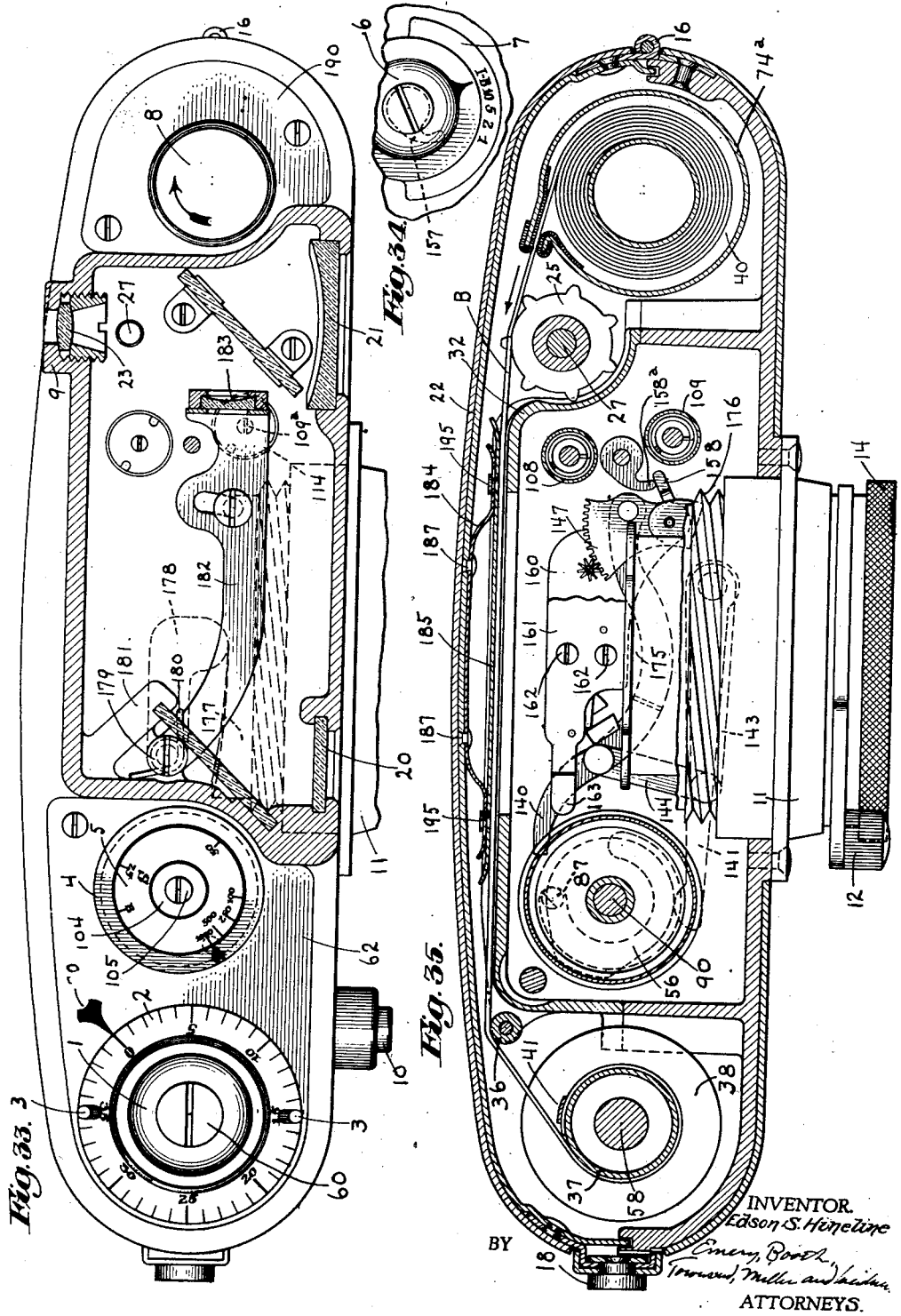
INVENTOR.
Edson S. Hineline
BY
Emery, Booth,
Townsend, Miller and Jackson
ATTORNEYS.

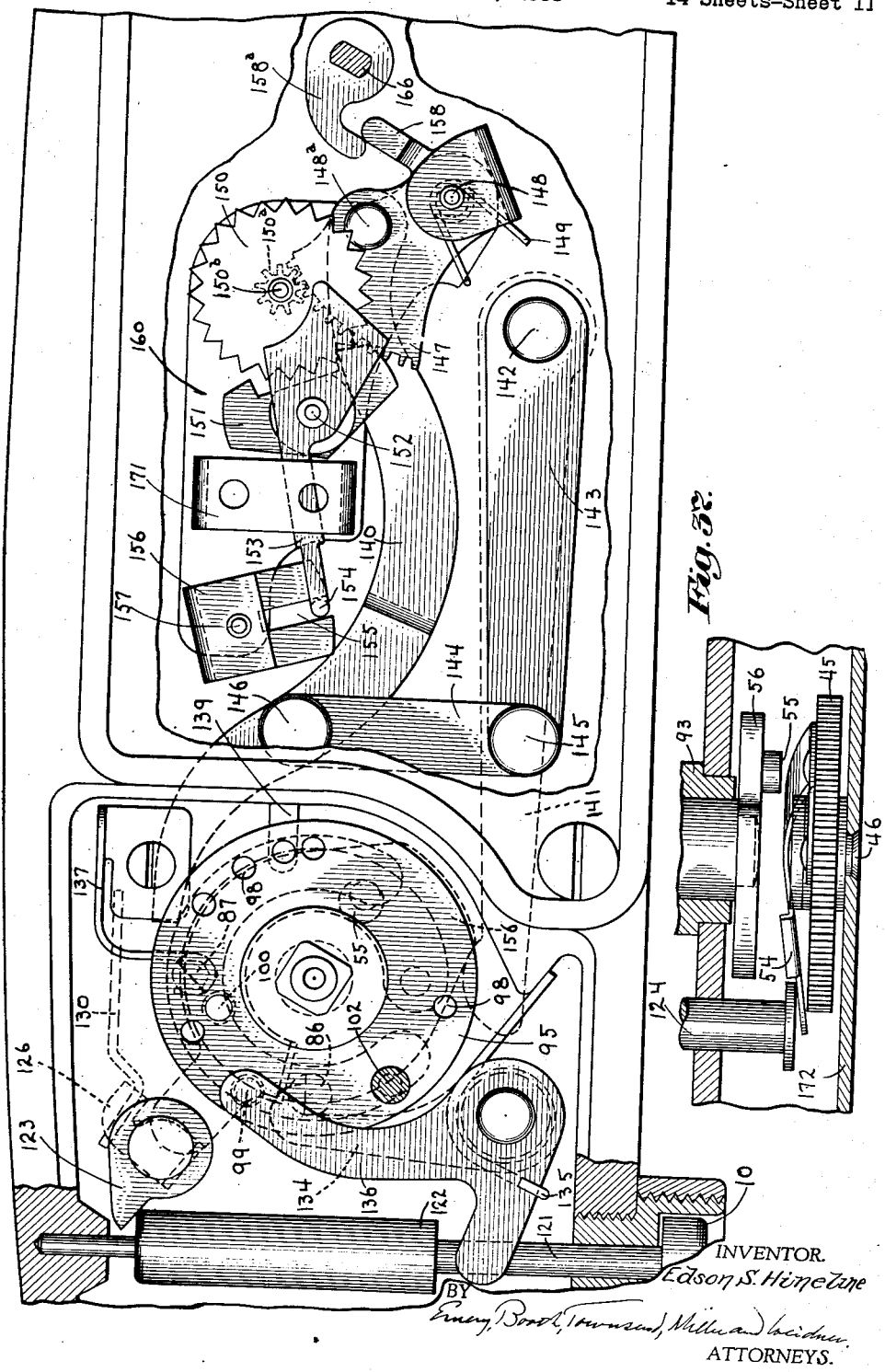

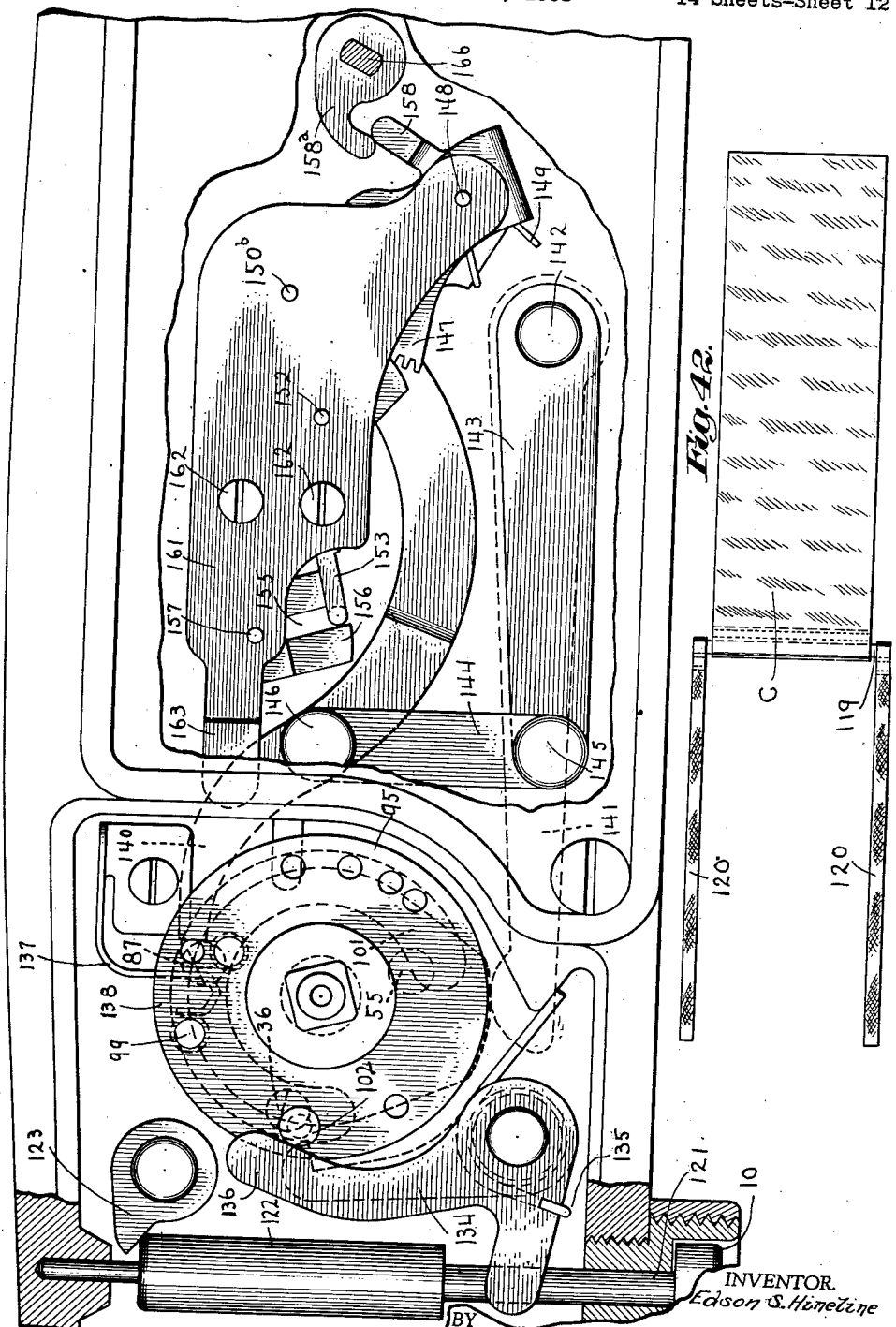

Jan. 21, 1941.     E. S. HINELINE     2,229,606
PHOTOGRAPHIC CAMERA HAVING SELF-CAPPING SHUTTER MECHANISM, ETC
Filed Dec. 3, 1938     14 Sheets-Sheet 13
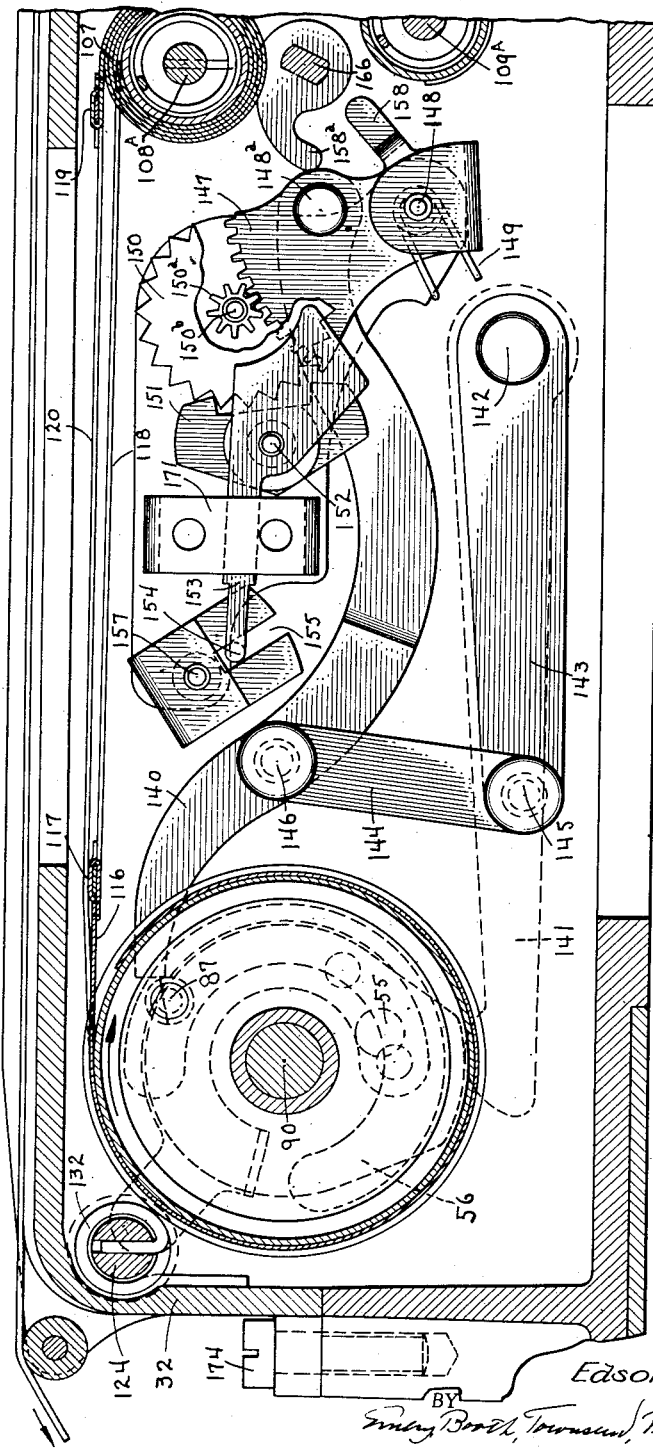
INVENTOR.
Edson S. Hineline,
BY
Emery, Booth, Townsend, Millard & Weidner
ATTORNEYS.

Jan. 21, 1941.   E. S. HINELINE   2,229,606
PHOTOGRAPHIC CAMERA HAVING SELF-CAPPING SHUTTER MECHANISM, ETC
Filed Dec. 3, 1938   14 Sheets-Sheet 14
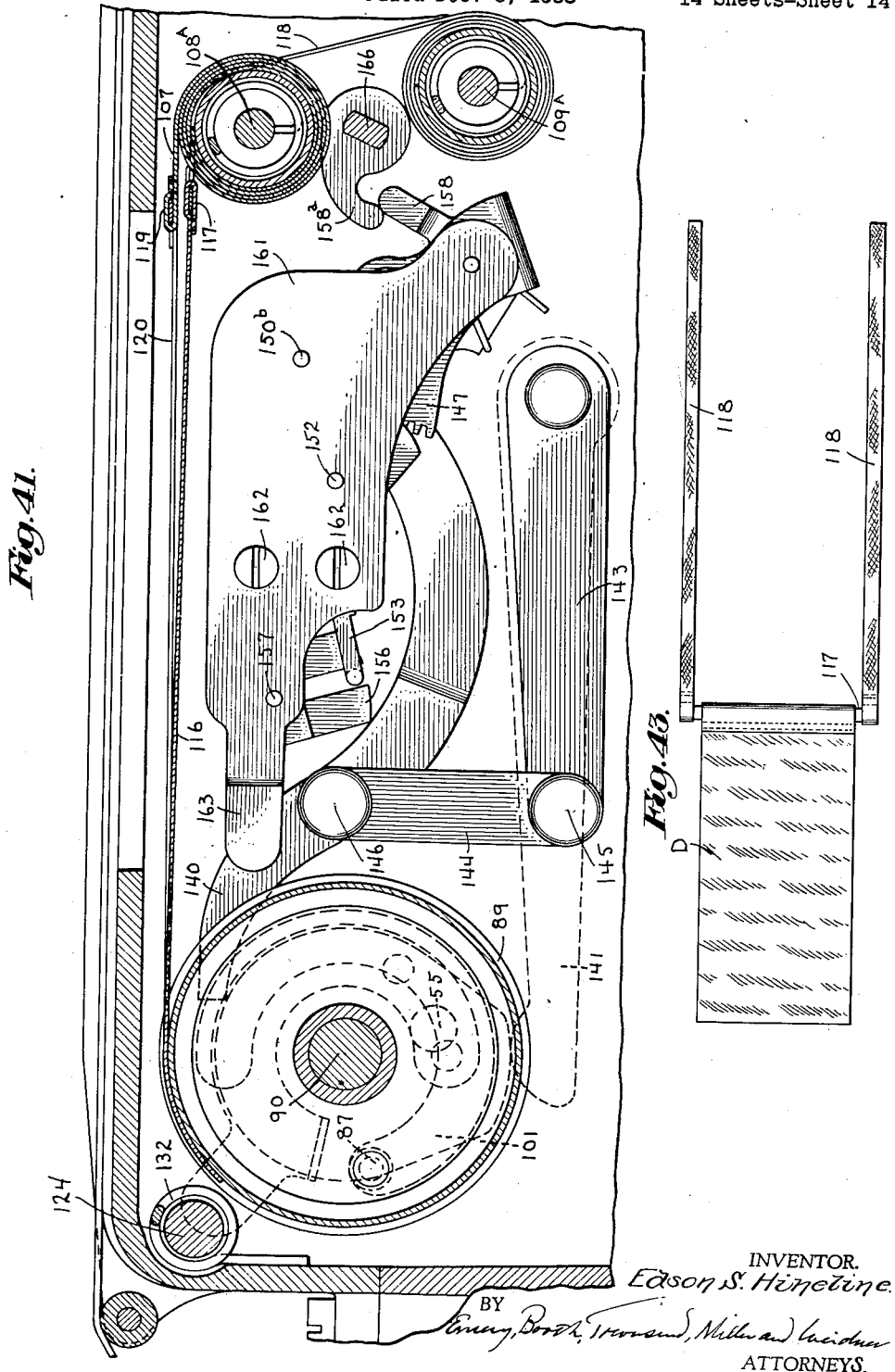
INVENTOR.
Edson S. Hineline.
BY
ATTORNEYS.

Patented Jan. 21, 1941

2,229,606

UNITED STATES PATENT OFFICE 2,229,606

PHOTOGRAPHIC CAMERA HAVING SELF-CAPPING SHUTTER MECHANISM, ETC.

Edson S. Hineline, Rochester, N. Y., assignor to The Folmer Graflex Corporation, Rochester, N. Y., a corporation of Delaware Application December 3, 1938, Serial No. 243,820

31 Claims. (Cl. 95—57)

This invention relates to new and useful improvements in photographic cameras, and particularly to the shutter mechanism thereof.

In order that the principle of the invention may be readily understood, I have disclosed a simple embodiment thereof in the accompanying drawings, wherein Fig. 1 is a top plan view of the camera showing the film winding, shutter knob, the shutter speed set knobs and the film rewind knob;

Fig. 2 is a front elevation of the camera;

Fig. 3 is a right side view thereof with the lens mount collapsed;

Fig. 4 is a right side view thereof with the lens mount extended;

Fig. 5 is a rear view of the camera upon a larger scale showing the take-up spool and measuring sprockets, the aperture opening and the film rewind dog;

Fig. 7 is a vertical transverse section through the take-up spool and winding knob;

Fig. 8 is an enlarged detail in perspective of the take-up shaft;

Fig. 9 is a similar enlarged detail of a winding knob;

Fig. 10 is a similar enlarged detail of the counter dial;

Fig. 11 is a transverse section through the take-up spool drive on the line 11—11 of Fig. 7;

Fig. 12 is an enlarged detail in perspective of the take-up spool shaft spacer;

Fig. 13 is a similar enlarged detail of the shutter driving gear;

Fig. 14 is an enlarged transverse section on the section line 14—14 of Fig. 16 at the time of the commencement of the second curtain travel;

Fig. 15 is an enlarged detail in perspective of one of the curtain sheaves and a fragmentary part of the index plate showing the means for connecting the two together;

Fig. 16 is an enlarged vertical section through the shutter setting mechanism setting forth clearly the method of assembly;

Fig. 17 is an enlarged perspective view of the curtain barrel showing the relation of the release pins;

Fig. 18 is an enlarged perspective detail of the shutter shaft together with the slow shutter cam and the shutter winding pin;

Fig. 19 is an enlarged detail elevation of the shutter index plate;

Fig. 20 is a side view of Fig. 19;

Fig. 21 is a vertical section taken through the curtain take-up rollers, and showing the construction of these rollers and their relation to the two curtain parts;

Fig. 22 is a plan view of the shutter winding dog when the shutter is all the way wound up and in tripping position;

Fig. 23 is a view similar to Fig. 22, excepting that the shutter has been released and has run to the all-the-way down position;

Fig. 24 is a view similar to Fig. 22 but illustrating how the shutter dog picks up the shutter pin when rewinding the shutter;

Fig. 25 is a vertical section through the camera upon a larger scale, and showing the shutter release mechanism with the curtain wound all the way up;

Fig. 26 is a view similar to the upper portion of Fig. 25, but indicating the position of the parts when the release button has been depressed;

Fig. 27 is a vertical section of a portion of Fig. 25 on the line 27—27 of that figure;

Fig. 28 is a perspective detail of the release dog;

Fig. 29 is a top plan view, with parts in section, of the shutter operating mechanism, parts of the case being broken away, and the shutter being represented as fully wound up and set for one-second exposure;

Fig. 30 is a partial detail of the shutter curtains, with the curtains positioned for the starting of an exposure;

Fig. 31 is an enlarged top plan view, particularly showing the slow-speed dial detent;

Fig. 32 is a longitudinal section of Fig. 6 on the line 32—32 thereof;

Fig. 33 is a horizontal section through the range finder;

Fig. 34 is an enlarged detail of the slow-shutter-speed-setting dial;

Fig. 35 is a horizontal longitudinal section showing the placement of the camera mechanism, the film take-up spool, the film magazine and the pressure pad;

Fig. 36 is a top plan view upon an enlarged scale of the shutter mechanism with parts broken away showing the release button depressed, the first curtain partially open and the shutter mechanism set for one-second exposure, the timing element for the slow shutter mechanism also being clearly shown;

Fig. 37 is an enlarged sectional detail of the shutter release dog in released position;

Fig. 38 is a view similar to Fig. 36, but representing the first curtain as having reached the end of its travel, the second curtain having been released and having started to open but retarded by the slow-speed mechanism, the shutter being set for one-second exposure;

Fig. 39 is an enlarged, partial longitudinal section of the slow-shutter timing mechanism with the second curtain about to be released by the slow timing mechanism, the shutter being set for one second;

Fig. 40 is a view similar to Fig. 37 but representing the first curtain as having traveled all the way across the exposure opening, pressure on the release button having been removed;

Fig. 41 is a view similar to Fig. 39, but representing the second curtain as having traveled all the way across the exposure opening and the slow speed mechanism as having been returned to re-set position;

Fig. 42 is a detail in plan of the first curtain;

Fig. 43 is a detail in plan of the second curtain; and

Fig. 44 is a detail in plan of a portion of the film strip.

Figure 6:
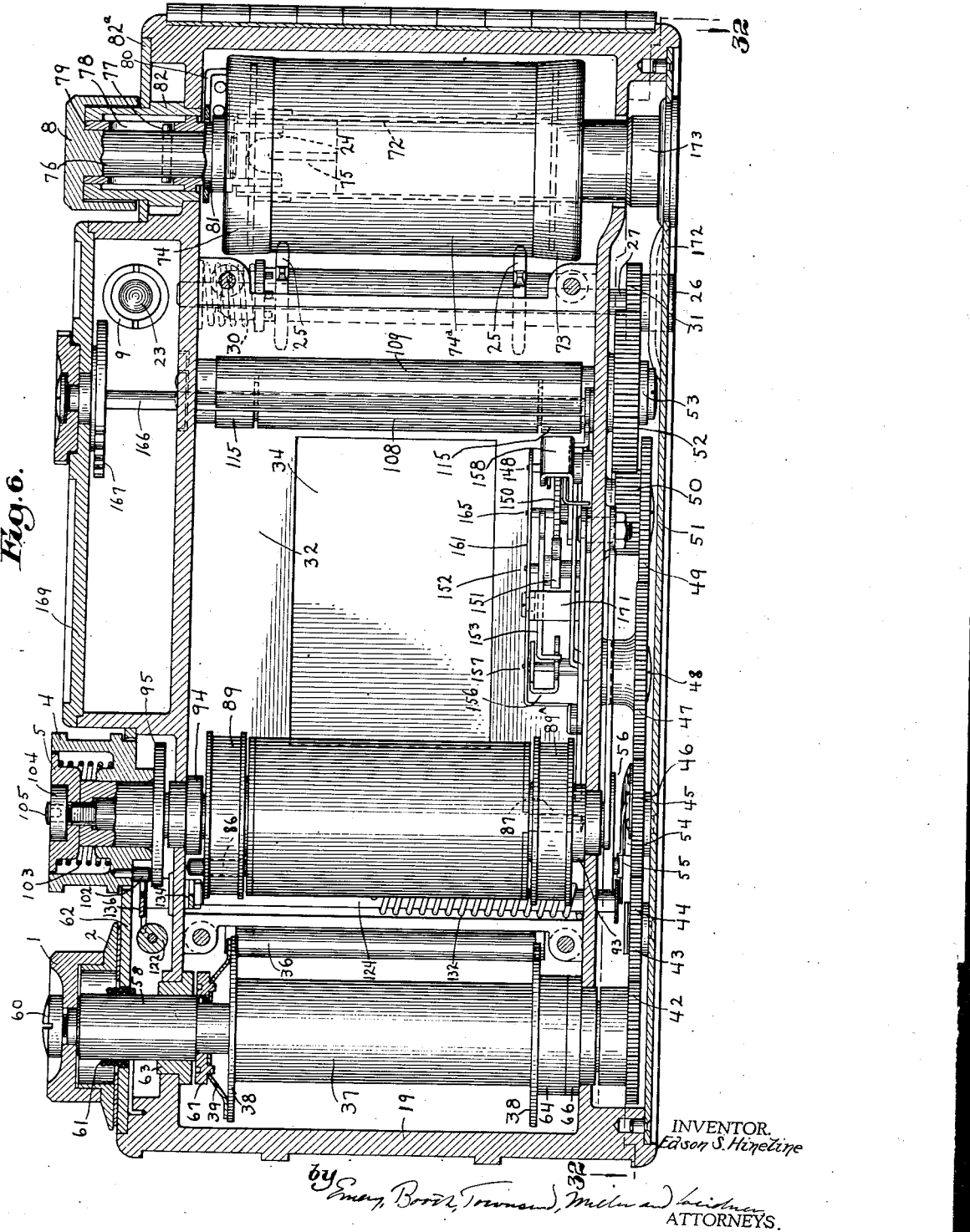
Fig. 6 is a longitudinal vertical section taken through Fig. 1, looking toward the focal plane, and showing the relative positions of the parts of the mechanism, and with the film magazine in place.

Reference is more particularly made to the drawings wherein is disclosed a single embodiment of my invention, to which, however, my invention is not restricted.

The photographic camera herein disclosed has many unique features which lend themselves to precision production methods of manufacture. The camera is unique in the placement and structure of its various parts, which afford a symmetrical and well balanced design without in any way impairing the operation of the camera. One of the most important features thereof is a focal plane shutter of the two-part curtain type which allows for a plurality of adjustments in the width of the curtain aperture. A further feature consists of novel means for controlling one of the curtains so that it is retarded, permitting exposures of relatively long duration. Another feature is a one-knob construction controlling the film wind, shutter wind and exposure counter. The construction is such that it is impossible to make a double exposure or to produce a blank due to winding without making an exposure. Another feature is a built-in range finder that is coupled to the focusing mount. Still another feature is a shutter construction that allows both curtains to run free upon release, there being no gears in mesh at the time of exposure, although the gear train which controls the winding of the shutter and the feeding sprocket from the film wind is always in mesh. The construction is such that it is necessary to wind the film for a complete frame before the shutter can be released. The whole camera has been constructed as a rigid structure that will at all times maintain accurate placement of the various parts and a uniform operation thereof.

A full understanding of the features of this invention will be had by referring to the drawings herein, wherein is disclosed the preferred embodiment to which my invention is not limited, except as set forth in the claims.

The case of the camera, which may be of any desired and appropriate form, is represented at A in the various figures of the drawings. In Fig. 1 the shutter or film winding knob is represented at 1 and the counterdial at 2, it being frictionally connected to the winding knob 1 in a manner more fully disclosed hereinafter. Short extending knobs 3 are provided for the purpose of changing the position of the dial 2 with respect to the knob 1. The shutter speed setting knob is shown at 4 and the shutter speed setting dial at 5. By means of this knob and dial the so-called instantaneous speeds are obtained (that is, speed from $\frac{1}{25}$ of a second to .001 of a second), and the bulb position is obtained on this dial when the slow shutter speed dial is properly set, the slow shutter speed knob being shown at 6 and the slow shutter speed dial at 7. The so-called slow shutter speeds (that is, speeds from .1 of a second to one second or longer) are obtained by the proper manipulation of said knob 6 with respect to the dial 7. A film rewind knob is shown at 8, the purpose thereof being to rewind the film back into the magazine after an entire exposure has been made. The eye piece of the range finder is shown at 9 and the shutter release button by which all exposures are made is shown at 10.

Referring to Fig. 2, the focusing mount is indicated generally at 11 and the focusing knob is shown at 12 by means of which the focusing mount is caused to rotate in a threaded nut thereby changing the position of the lens in a forward or backward direction with respect to the focal plane. A knurled ring 14 is provided on the forward part of the focusing mount for use in extending the lens barrel. This construction is more clearly shown in Figs. 3 and 4. Screws 15, 15 are provided for holding the focusing mount to the camera case A. A hinge 16 is provided for the camera case cover; the lens is represented at 17, and a cover latch of the conventional sliding type for maintaining the cover in a closed position is indicated at 18. The casing A is provided with a small opening 20 for the range finder. The range finder negative lens is indicated at 21, and the camera case cover itself is indicated at 22 in Figs. 3 and 4.

Referring now to Fig. 5, the eye piece lens of the range finder is indicated at 23, and a film rewind dog at 24. Film winding sprockets are shown at 25, 25. A sprocket release button is provided at 26, and a sprocket shaft 27 is suitably mounted to receive the sprockets 25, 25. A sprocket shaft dog pin is provided at 28. The sprockets 25 have a projecting hub with a series of notches 29 through which the pin 28 is forced by a coiled spring 30. When the pin 28 is in the position shown in Fig. 5 the sprockets 25, 25 are connected to the gear train through a gear 31, shown in dotted lines in Fig. 5 and more clearly shown in Fig. 6. The purpose of the described construction is to allow the sprockets 25, 25 to be disengaged from the gear train when the rewinding of the film takes place. A cover casting 32 is provided that serves to cover up the parts of the shutter and at the same time form the focal plane of the camera. The said cover casting 32 is provided with raised guides 33, 33 on either side of the exposure opening 34. Two additional guides 35, 35 serve to keep the film strip in position when traveling across the focal plane. A film roller is shown at 36 over which the film passes on its way to the suitably mounted film take-up spool 37 which is provided with flanges 38, 38 to further serve as a means of keeping the film in the proper alignment. The said film spool 37 is driven through a spring clutch member 39, more fully explained hereinafter. A film magazine 40, more clearly shown at the right in Fig. 6, is placed in a space provided for it under dog 24. The film is threaded across the exposure opening 34, the perforations in the film B, Fig. 44, engage the teeth of the sprockets 25, 25, and the film passes over roller 36 to roller 37, where the end of the film B is slipped under a retaining spring 41 more clearly shown in Fig. 35. The path of the film B just referred to is also very clearly shown in Fig. 35.

Fig. 6 clearly shows in section longitudinally of the camera the placement of the various parts described together with the placement of the shutter parts. When the film and shutter winding knob 1 is turned contraclockwise, a gear 42, shown at the lower left hand end of Fig. 6, is caused to rotate with it by means more fully disclosed presently, driving gear 43 on stud 44 and a shutter reset gear 45 on stud 46 and idler gear 47 on shoulder screw 48 and idler gears 49, 50 on shoulder screw 51, all suitably mounted in the casing. The gears 49 and 50 are keyed together and so revolve as a unit, driving an idler gear 52 mounted on a shoulder screw 53. This, in turn, drives measuring sprocket gear 31, shaft 27 and the said sprockets 25, 25. It will now be seen that when the knob 1 is turned, the film B having previously been threaded, sprockets 25, 25 will pull the film out of the magazine 40 and allow only so much to be fed as one turn of sprockets 25, 25 will feed. The film then passes across the focal plane and is wound up on the spool 37 as previously described. When the winding knob 1 is turned to wind the film B, it causes to be driven the gear 45 which carries integral therewith a shutter rewind pawl 54, shown in detail in Figs. 22 to 24, which causes the shutter to be rewound through the contact of spring pawl 54 with pin 55 attached to the shutter shaft cam 56, more clearly shown in Fig. 6 and in detail in Fig. 18, causing shutter to be rewound. The construction of the shutter mechanism will be more fully disclosed hereinafter. The rotation of knob 1 completely to rewind the shutter is just sufficient to turn the film winding sprockets 25, 25 one complete revolution.

Fig. 7 shows clearly and upon a larger scale the film winding mechanism, including the film-shutter winding knob 1, and film counter dial 2, itself more clearly shown in detail in Fig. 10. The said counter dial is so constructed as to form a friction drive through the flexible portion 57 of said dial engaging the inner portion of the knob 1. The purpose of this is to enable the operator to reset dial 2 with respect to the knob 1 after the film B has been loaded into the camera and wound far enough to be in position for the first exposure. Said knob 1 is attached to a shaft 58 by means of a milled end 59, more clearly shown in Fig. 8. Over the said milled end the knob 1 is fitted, it having an opening of a suitable shape to key it to shaft 58, Fig. 9. It is then held in place by screw 60. It will be noted that when the knob 1 is turned in a contraclockwise direction, the shaft 58 and dial 2 will also be turned in the same direction. It is necessary that this knob be capable of being turned in one direction only and therefore a spring clutch 61 is placed about the shaft 58 in the form of a coil and anchored in the case casting A, the other end of the spring being free.

When the knob 1 is turned in a contraclockwise direction, the spring 61 tends to open up and enlarge, allowing the shaft 58 to turn freely. When, however, it is attempted to turn the knob 1 in a clockwise direction, the spring 61 is caused to wind around the shaft 58, thus locking it and preventing the said shaft turning in a clockwise direction. The shaft 58 and spring 61 enter through a hole in the camera mechanism cover 62 and the shaft 58 passes through bearing 63, as clearly shown in Fig. 7.

On the lower end of shaft 58 is attached a sleeve 64 which serves both as a spacer and as a bearing for the lower end of said shaft. Said sleeve 64 is anchored to shaft 58 because of having its ends milled as clearly shown in Fig. 8. The said sleeve 64 is clearly shown in Fig. 12. Also over said milled end is placed gear 42 which is held in position by screw 65. Said gear 42 is more clearly shown in Fig. 13. The sleeve 64 extends through bearing 66 in the lower portion of the camera case A. The upper end of said shaft 58 is provided with a pin 66a, which engages with a film spool driving dog 67 shown in Fig. 7. Said dog engages driving clutch 39 by reason of having two extending bosses 68, 68 engage holes 69, 69 more clearly shown in Fig. 11. The knob 1 is turned in a contraclockwise direction carrying with it shaft 58, pin 66a, driving dog 67 and clutch spring 39, and the film take-up roller 37 with its flanges 38, 38 is caused to be driven with it. The spool 37, however, is free to slip in this assembly so that only that portion of the film B that has been fed by the sprockets 25, 25 is caused to be wound up. This maintains a slight tension on the said film between spool 37 and sprockets 25, 25, thus helping to preserve the alignment of the film across the exposure opening. The film magazine 40 is placed in position and the film is threaded across to the take-up spool 37 as previously described and is wound in position to No. 1 exposure. The dial 2 is then rotated through the aid of pins 3, 3 until the zero indication appears opposite the exposure indicating arrow 70, clearly shown in Figs. 1, 31 and 33.

The magazine 40, shown most clearly in Figs. 6 and 35, is made up of the following parts, viz: an inner barrel 72 which is free to rotate in said magazine 40, flange end 73, and flange end 74, an outer barrel 74a and a flat key 75 across the said inner barrel 72. The flat key 75 is used for rewinding the film after the exposures have been made. To accomplish this readily, the following structure is used, shown most clearly in Fig. 6. The knob 8 is provided with an inwardly extending shaft 76 which carries a cross pin 77 free to slide up or down in a slot 78 of a suitably positioned driving member 79, thus enabling the operator to slide the winding knob 8 well above the camera for more convenient winding. When rewinding, it is necessary to depress the button 26 so as to disengage the sprockets 25, 25. In order to remove the magazine 40 from the camera, it is necessary to disengage the film drive dog 24 (Figs. 5 and 6) from the film cross bar 75. This can only be done when the camera door or cover 22 is open because attached to said camera door or cover 22 is a latch bracket 80 which has two extending arms fitting into groove 81 of the driving member 79 when the door is closed. This is more clearly shown in Fig. 6. When the door or cover 22 is opened, the latch bar 80 is withdrawn from the groove 81. When the knob 8 is pulled up, the pin 77 engages driving member 79, pulling it therewith to the end of its travel in bushing 82 held in place with a cover 82a, thus withdrawing the dog 24 from the film magazine 40, allowing the ready removal of the magazine.

I will now refer to and describe in detail the shutter mechanism. The shutter as herein disclosed is made up of parts shown most clearly in Figs. 14 to 17. Therein is shown a section of tubing 83 having keyed ends 84, 84, to which are attached disks 85, 85 carrying pins 86 and 87. This construction is most clearly shown in Fig. 17. Through this assembly is placed a bushing 88, shown in Fig. 16. On the ends of the curtain roller 83, constructed as just described, are assembled a sheave 89 and 89A, best shown in position in Fig. 6. The sheave 89, shown in Figs. 15 and 16, is assembled on the top of the said curtain roller, and the sheave 89A is assembled at the bottom of the said curtain roller 83. This assembly of curtain roller and the two curtain sheaves is then assembled on shaft 90 which has assembled to it the cam plate 56, shown most clearly in Fig. 18. Said cam plate 56 carries notches 91 which are engaged by extending parts 92 on sheave 89a, after which curtain roller 83 is then placed on shaft 90 and the second sheave 89A is placed over shaft 90. The lower end of the shaft 90 is carried in a bearing 93, clearly shown in Fig. 6, the said cam plate 56 being on the lower side of the inner camera wall, the lower sheave curtain roller 89A being mounted on the upper side of the lower inner camera wall, the upper sheave 89 being just below the upper camera wall and supported in a bearing 94. Then a shutter index plate 95, shown separately in Fig. 19 as in position in Fig. 16, having a hub 95a and cut-out places 96, is assembled through bearing 94 into sheave 89, engaging bosses 92. The said index plate 95 is also very clearly shown in Fig. 20. Said index plate 95 is equipped with a squared opening 97 at the upper end to engage the squared end of the shaft 90. Said index plate 95 has a series of holes 98, 98. The function of these holes will be later set forth. Also attached to said index plate 95 are pins 99 and 100. The pin 99 provides a retarding means functioning as such when the first curtain runs down, as will be more clearly set forth hereinafter. The pin 100 provides a definite stop when the first curtain runs down and when the shutter is rewound.

It will be seen from the foregoing description that the two sheaves 89, 89A, the cam plate 56, shaft 90 and index plate 95, and shutter speed dial 5 are all connected together and revolve as a unit.

It will be noted that, as shown in Figs. 6, 14, 15 and 16, sheaves 89 and 89A have slots 101 to clear pins 86 and 87 in the respective sheaves. This allows the curtain roller 83 to make approximately three quarters of a revolution within this assembly. In other words, said curtain roller 83 is free to turn upon shaft 90 for that part of a revolution equal to the length of thes lots 101. The knob 4, as shown in Fig. 16, carries a pin 102 and slides over the hub 95a of the index plate 95. In said knob 4 is placed a coiled spring 103 held in position by shutter speed plate or dial 5 and nut 104, a screw 105 serving to lock nut 104. This assembly is clearly shown in Fig. 16 and in Fig. 6.

The gear 45 referred to in the description of Fig. 6 and shown also in Figs. 22, 23 and 24, carries attached to it a spring pawl 54 provided with rivets 106, 106. When the winding knob 1 is turned, the gear 45 is caused to rotate through gears 42 and 43 in a contraclockwise direction, carrying with it spring pawl 54. Fig. 23 shows the position of the parts at the start of winding. When gear 45 has made approximately one quarter of a revolution, said pawl 54 engages pin 55 which is attached to the cam plate 56 and therefore to shaft 90 which is caused to travel with the gear. The position of first contact is shown in Fig. 24. This movement is continued for approximately three quarters of a revolution until the position shown in Fig. 22 is reached. Since pins 86 and 87 of the curtain roller 83 lie in slots 101, 101, said curtain roller 83 will be caused to be carried along with the film sheaves, thus winding up both curtains—that is, the No. 1 curtain attached to film sheaves 89, 89A, indicated as C, and the No. 2 curtain attached to curtain roller 83, indicated at D. This relationship is clearly shown in Fig. 21, wherein the shutter is set for an exposure. Since the gear train can only move in one direction because of the clutch 61 previously referred to, the shutter will remain wound up until spring pawl 54 is moved away from contact with pin 55.

Fig. 21 is a fragmentary longitudinal section of the shutter mechanism showing the placement of the two curtains. Curtain No. 1, indicated at C, is partially wound around curtain roller 108, which rides on a shaft 108A and has a spring 110 tending to cause a rotation thereof in a clockwise direction. Said spring 110 is anchored to said shaft 108A through hole 111 in shaft 108A and the other end of said spring is anchored in a hole 112 in bushing 113, which is permanently attached to said curtain roller 108. Since the two curtain take-up rollers are similar the same description applies to both 108, 109. Curtain shafts 108A, 109A are attached to the camera case A through lock nuts 114, thereby providing adjustment for the tension of these curtain rollers. Also running on curtain roller shaft 108A are two idlers 115, 115, provided for the tape for the second curtain D to travel on. The curtain No. 2, designated as D, is partially wound up on curtain roller 83 and has attached to the opposite end a strut 117 and tapes 118, 118 which pass over said idlers 115, 115 on to take-up roller 109. Curtain C, which has previously been described as partially wrapped on roller 108, is also provided on its outer end with strut 119 and tapes 120 which are attached to curtain sheaves 89, 89A.

It will now be clearly understood that if the winding knob 1 is turned all the way to stop position, the curtain D will be rolled up on curtain roller 83, and curtain tapes 120 will be wound all the way up on sheaves 89, 89A. The curtains C and D will appear as in Fig. 30, curtain C overlapping curtain D. The entire curtain is now in position for making the exposure.

The exposure is made by pressing on shutter release button 10, Figs. 1, 2 and 29. Pressure upon said shutter release button 10 causes bar or spindle 121, Fig. 29, suitably positioned in the camera case A, to be moved rearward or inward. The said bar or spindle 121 carries an enlarged section 122 to engage a pivoted finger 123.

Referring now particularly to Figs. 25 to 28, there is provided a cam finger 123 attached to a vertical shaft or rod 124, suitably mounted in the camera case A, and also a cam plate 125, more clearly shown in Fig. 28, having an upturned end 126 which fits into a flat on the hub 127 of cam finger 123. The opposite end of cam plate 125 has a turned down portion 128 which engages a cam face 129 of a cam plate 130 which is fastened to the shutter enclosure plate 32 with rivets 131, 131. Coiled about shaft 124 is a spring 132 which tends to cause said shaft 124 to turn in a contraclockwise direction. Spring 132 is fastened to shaft 124 by means of a bent-in portion engaging a hole 133 in said shaft. The other end of said spring rests against the camera case A. It will be noted that said spring 132 is both a torsional and a compression spring tending to turn shaft 124 in a contraclockwise direction and at the same time pushing it upward. When the shutter release button 10 is depressed, cam finger 123, constituting a release member, is caused to rotate in a clockwise direction forcing cam plate 125 under the said cam face 129 in a downward direction, thus causing shaft 124 also to be thrust in a downward direction, depressing winding pawl 54 to the position shown in Fig. 37, thus releasing pin 55 (Figs. 22-24) which will allow shutter shaft cam 56 to rotate in a clockwise direction, and since said cam 56 is a part of the curtain No. 1 assembly through shaft 90 and sheaves 89, 89A, the said curtain No. 1, indicated at C, will be wound up on roller 109, thus commencing an exposure. The timing of the exposure will depend upon how quickly curtain No. 2, indicated at D, on roller 83 is released.

I have previously pointed out that index plate 95 is keyed to shaft 90 and that sheaves 89, 89A therefore travel with it. When shutter release button 10 is depressed, a pawl or latch 134 of curtain D, shown most clearly in Figs. 29 and 36, is caused to move in a clockwise direction under the influence of a spring 135 coiled about its pivot, carrying with it a second pivotal member 136 which is integral with said pawl or latch 134 and which engages pin 86 on the roller of curtain D, thus keeping it from movement until said pawl or latch 134 is disengaged from pin 86. Fig. 36 shows the parts in this relationship, curtain No. 1 (C) having traveled nearly all the way across the exposure opening. Pin 102 in knob 4 has been engaged in one of the index plate holes (Figs. 16 and 19), which allows the said curtain C to travel nearly all the way across the exposure opening before pin 102 engages said arm 136 forcing it outward, thus disengaging said pawl or latch 134 from pin 86, allowing curtain No. 2 (D) to close.

It will be seen that by setting knob 4 carrying pin 102 in various holes 98, 98 in the index plate 95, the curtain D can be caused to commence its movement at any predetermined time after curtain No. 1 (C) starts. For example, if pin 102 were set in index hole 98C (Fig. 29), curtain No. 2 (D) would be caused to move almost immediately after the curtain No. 1 (C) started its motion. This would create a very narrow slot during the curtain travel across the exposure opening. If, however, pin 102 were engaged in index plate opening 98B (Fig. 29), the slot would be formed at approximately half the distance of the exposure opening, but if the pin 102 were placed as actually shown in Fig. 29, a full exposure opening would occur. That is, curtain No. 1 (C) would travel all the way across the exposure opening before curtain No. 2 (D) would be released. If, however, pin 102 were engaged in index plate hole 98A, curtain No. 1 (C) would open upon the initial pressure of shutter release button 10, and since the total travel of index plate 95 is approximately three quarters of a revolution, said pin 102 would not travel far enough to cause pawl or latch 134 to disengage pin 86 and allow curtain No. 2 (D) to close, but upon the release of pressure on shutter release button 10, the latter would be caused to be moved outward, carrying with it member 122, and also carrying with it arm 136, thus disengaging pawl or latch 134 from pin 86, and allowing curtain No. 2 (D) to close, forming a so-called bulb exposure. The parts then would be restored to the position shown in Fig. 29, excepting that the index plate 95 would be in the position shown in Fig. 38.

When curtain No. 1 (C) is released as indicated in Fig. 29, index plate 95 revolves in a clockwise direction until it reaches the position shown in Fig. 38, carrying with it stop pin 99 and retarding pin 100. Just before said retarding pin 100 reaches the position shown in Fig. 38, it had to pass a spring 137 shown in Figs. 25 and 36 as secured to camera case A, forcing it to yield far enough to allow pin 100 to pass. After pin 100 passes, the spring 137 again assumes its normal position. Stop pin 99 engages an upturned portion 138 (Fig. 38) of spring 137, forming a definite stop. The shutter cannot bounce or revolve in the opposite direction, because pin 100 would again have to pass spring 137, but the shutter would not have sufficient power on the rebound to depress said spring 137 to allow it to pass, thus forming a fixed stop on the first curtain shutter parts.

During the foregoing operation, slot 101 in sheave 89 traveled in a clockwise direction, thus allowing a clear passage for pin 86 when released. When pin 86 has been released it will travel to the end of the slot and stop, as illustrated in Fig. 41. It will be seen that when the winding knob 4 is turned, thus turning shaft 90 and sheaves 89, 89A, index plate 95 and curtain roller 83 will also be caused to turn through engagement of pin 86 with the end of slot 101 and sheave 89. The winding motion is continued until stop pin 99 reaches the position shown in Fig. 29 in contact with stop 139. The shutter will now be reset ready for subsequent exposures. The knob 6, best shown in Fig. 34, would be in the position there shown, that is, the pointer of knob 6 would be opposite position 1—B on scale 7 when either so-called slow speed or bulb exposures are being made. However, on instantaneous exposures, the exposure obtained would be that for which knob 4 and dial 5 called for (best shown in Fig. 33), but to make a bulb exposure it is necessary for the indicator on knob 4 to be set at B (bulb) on dial 5 to have a correctly functioning bulb exposure. However, a bulb exposure can be made if the indicator on dial 4 be set at B (bulb) on dial 5, and the indicator on knob 6 would be any place on dial 7 (Figs. 1, 31 and 34). Moreover, upon the release of the said shutter release button 10 when making a bulb exposure, the speed called for on knob 6 and dial 7 would be added to the bulb exposure after the releasing of the said release or exposure button 10. The dials in Figs. 33 and 34 are set to obtain an exposure of approximately .001 of a second. In changing the instantaneous exposure for $\frac{1}{25}$ of a second to .001 of a second, the bulb knob 6 is not changed in relation to the dial 7. The relation of knob 6 and dial 7 is changed only when slow speed exposures are wanted and at such time the indicator on knob 4 will point to the indication S over 25 on the dial 5. When instantaneous exposures are made, the mechanism of the slow shutter timing device is positioned as shown in Fig. 35.

As pointed out hereinbefore, this camera is capable of making so-called slow exposures in the nature of .1 of a second to one second or longer. These exposures are automatically timed. In order to make an exposure of the so-called slow type, knob 6 is set at one second on dial 7 (Figs. 31 and 34), and the indicator on knob 4 is set at 25S on dial 5, as in Fig. 31.

Assuming the shutter has previously been wound and is ready for operation, the exposure is made by depressing the shutter release button 10, which moves bar or spindle 121, 122 (Fig. 29) rearward or away from the front of the camera case A, allowing arm 136 and pawl 134 to be moved into the position shown in Fig. 36. At the same time, the shaft or rod 124 (Fig. 25) will be caused to be moved downward as previously described concerning instantaneous exposure, thus depressing film winding pawl 54 as shown in Fig. 37, and freeing holding pin 55, allowing to function the slow shutter speed cam 56 which is part of the shutter assembly previously referred to, thus allowing the curtain No. 1 (C) to travel across the exposure opening from left to right for its full travel. The position of pin 55 is shown in dotted lines Fig. 36, just before it reaches the end of its travel and said pin is shown in its full travel position in Fig. 38. In said Fig. 38, curtain No. 1 (C) has traveled all the way across and so long as the shutter release button 10 is depressed, curtain No. 2 (D) cannot travel. However, index plate 95 rotates with curtain No. 1 (C), carrying with it pin 102 which is shown in Fig. 36 as about to engage arm 136, and, as shown in Fig. 38, pin 102 has engaged arm 136 and has withdrawn pawl 134 from the face of roller pin 86 of curtain No. 2 (D), which now starts to travel but is held up by roller pin 87 of said curtain No. 2 (D) by detent 140, as shown in Fig. 38.

The slow shutter operating cam 56 will be in the position shown in Fig. 32, depressing arm 141. Said arm 141 is attached to a shaft 142 which, as shown in Figs. 36, 38, 39, 41, has fast thereon a second arm 143. A link 144 is connected to said arm 143 by shoulder rivet 145 and is connected to detent 140 by a second shoulder rivet 146, as shown in said Figs. 36, 38, 39, 41. The detent 140 will now be in the position shown in Fig. 38. The curtain roller 83 will now start to rotate, carrying with it pin 87 which is now in contact with detent 140, which detent will be driven back by pin 87 until said detent is pushed far enough back for pin 87 moving clockwise to clear the detent. The position of pin 87 and detent 140 just before pin 87 clears said detent 140 is best shown in Fig. 39.

As said detent 140 is pushed away by pin 87, a toothed sector 147, best shown in Figs. 36 and 39 as pivoted on pin 148, is caused to rotate about its axis through shoulder rivet 148a connecting detent 140 to said sector. Said sector turns against the force of spring 149 and causes a notched wheel 150 to rotate through a pinion 150a on stud shaft 150b past an escapement 151 pivoted on pin 152, thus causing said escapement to vibrate on its said axis 152. To said pivotal pin 152 is also attached a lever 153 having a pin formation on its outermost end 154 riding in a groove 155 of an inertia balance 156, thus causing said inertia balance to be vibrated on its axial pin 157, thereby retarding the motion or the rate of acceleration of notched wheel 150. This construction is most clearly shown in Figs. 36, 38, 39 and 41.

When the pin 87 pushes detent 140 so as to allow pin 87 to pass, curtain No. 2 (D) on roller 33 will then be allowed to close, thus ending the exposure time of one second. The positions of the curtains just before pin 87 passes detent 140 will be that shown in Fig. 39 with curtain No. 1 (C) wound all the way up on roller 108. Curtain No. 2 (D) will have advanced to the exposure opening. After pin 87 passes detent 140 and curtain No. 2 (D) has traveled across the exposure opening, the two curtains will then appear as in Fig. 41, both curtains being closed and capped.

It is important to be able to time the slow shutter speeds. Therefore the sector 147 has an extending arm 158, clearly shown in Figs. 36, 38, 39 and 41. When the camera exposure is set for one full second, a stop pawl 158a, more fully referred to hereinafter, is in the position shown in Fig. 39, and knob 6 has the relation to dial 7 shown in Fig. 31. The distance between said arm 158 and the end of stop pawl 158a is then at its greatest point of adjustment. If the space between the curved end of stop pawl 158a and arm 158 is shortened, the travel of detent 140 will also be limited—that is, pin 87 will travel a greater distance before engaging detent 140 and the total time that notched wheel 150 is rotated will be lessened.

It will be seen that if the stop pawl 158a is rotated far enough to engage the arm 158, the detent 140 will be held back clear of pin 87 and no retarding will take place. This is the position of stop pawl 158a when instantaneous and bulb exposures are being made as indicated in Fig. 35, with the dial settings as indicated in Fig. 33.

In Fig. 41, the entire curtain has traveled all the way across the exposure opening, and the pin 87 will be in the position shown in said figure. The detent 140 will be caused to resume its previous position under the influence of spring 149, returning the sector to the position shown in Fig. 36.

It will be clear from the foregoing description that the slow shutter speed mechanism does not come into action excepting when cam 56 has rotated all the way around to the position shown in Fig. 32, thus forcing outwardly the bar 141.

When instantaneous exposures are made, pin 102 (Fig. 16) is engaged in one of the holes 98 on the index plate 95 in advance of the twenty-fifth of a second exposure. Said pin 102 will engage arm 136, thereby releasing pawl 134 from pin 86 before the cam 56 engages with bar 141, to pull detent 140 into position. Thus, even though the slow shutter speed mechanism is set for a slow speed, since curtain No. 2 (D) would have been released before detent 140 comes into position, the exposure will be as set for by knob 4 with respect to dial 5. Thus, it is not necessary when making instantaneous exposures to pay any attention to knob 6 and dial 7. The only time that dial 7 needs to be set is when slow shutter speeds are used or when a bulb exposure is to be made. However, the proper place for knob 6 with respect to dial 7 will be in the B—I position (Fig. 31) when all instantaneous exposures are made, because then it will be possible to use any of the speeds called for on knob 4 and dial 5, including all instantaneous exposures and bulb exposures without reference to knob 6 and dial 7.

Referring more particularly to Figs. 6 and 35, the slow shutter speed mechanism is mounted between two plates 160 and 161, and is held to the base of the camera with screws 162, 162. On said plate 161 is an extending finger 163, whose purpose is to guide the detent 140, as clearly shown in Fig. 35. Stop pawl 158a, hereinbefore referred to, is attached to a vertical shaft 166 extending up through the camera case, as best shown in Fig. 6, and attached to the upper end of said shaft is a notched plate 167 for holding said shaft 166 in a predetermined position as set by knob 7. A flat spring 168, shown in dotted lines in Fig. 31, has a bent-out portion for riding in these notches, and has a detent formed in its surface for riding into the notches of disk 167 and holding said shaft 166 in proper position. Said spring is fastened to the cover 169 by rivets 170, 170, as shown in Fig. 31. Plates 160 and 161 are held in spaced relation to each other by spacing member 171 clearly shown in Fig. 39.

The camera is equipped with a lower or bottom mechanism plate 172 (Figs. 6 and 40) to which is attached a member 173 which serves as a positioning member for magazine 40 (Fig. 6). Said member 173 also has a tapped hole which serves as a tripod socket. Shutter cover 32 is attached to the camera case proper A with screws 174, 174 as shown in Figs. 5 and 39.

In Fig. 35 a lens mount is shown collapsed, with the extending part 175 extending into the camera.

This camera herein disclosed is also equipped with a range finder substantially the same as my co-pending applications, Ser. Nos. 155,259 and 156,360, now Patents Nos. 2,167,435 and 2,167,436, issued July 25, 1939, with some modifications to adapt it for use in this type of camera, and which I will now describe with particular reference to Fig. 33.

Referring to said Fig. 33, and also to Fig. 35, the rear of the threaded portion of the focusing barrel mount 176 has attached thereto a cam 177 which is ridden upon by a cam shoulder 178 pivoted by means of a shoulder screw 179 in the casing and held in contact with said cam 177 by a spring 180 and limited in its motion by means of boss 181. Said cam 177 can be either a raised cam or a receding cam depending upon the focal length of the lens and the pitch of thread of the barrel mount 176. For example, if the movement of the negative lens 183 were such that it would not cause sufficient movement of arm 182 carrying said lens 183, a raised cam would be used. If the motion of the threaded barrel mount 176 were greater than the motion required for moving said arm 182, then a receding cam would be used. In such case, the raise of the cam would be subtracted from the advancement of the lens barrel, thus arriving at a motion which would correlate the movement of lens 183 with the focusing movement of the lens.

Again referring to Fig. 35, the camera back 22 is provided with a spring 184 attached to which is a pressure pad 185 for maintaining the film B (Fig. 44) in contact with the shutter cover 32 which forms the focal plane of the camera. Said spring or springs 184 are attached to the pressure pad 185 with shoulder rivets 195 and said spring is attached to the back of the camera by rivets 187.

The counting device functions as follows. When the knob 1 is turned to wind the film and set the shutter, the gear 42 is also caused to rotate in a manner previously described, revolving with it the gear 43 and gear 45. Since gear 45 makes one complete rovlution each time the shutter is rewound even though the shutter mechanism itself makes only three quarters of a revolution, said gear 45 rotates until it picks up pin 55, thus advancing approximately one quarter of a revolution before starting the motion of the clutch mechanism. Since dial 2 is rotated with knob 1 and gear 42, any motion of gear 42 is communicated to dial 2. The gear 45 has one more tooth than the gear 42, and since gear 45 must make one complete revolution, gear 42 will make one complete revolution plus the spacing of one tooth. If said dial 2 is graduated to represent tooth spacing, each time knob 1 is turned to reset the shutter, said knob 1 will make one revolution plus the spacing of one tooth. Dial 2 will also make one revolution plus the spacing of one tooth, and since the graduations are spaced a distance apart equal to one tooth, a count of one space will result. This construction provides a counting device without any additional parts, and since no exposure can be made excepting after the winding of knob 1, the count is absolutely reliable and accurate.

The camera structure herein disclosed carries out all the functions of photography in a manner that requires a minimum of adjustments and the construction is such that it presents no manufacturing problems.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic camera having, in combination, a camera casing, a focal plane shutter therein having two curtains, means for supporting a film to be fed at will past the exposure opening of the camera, rotary means for conjointly feeding the film and winding the said shutter, including a train of constantly meshing gears for effecting the said feeding of the film and the said winding of the shutter, said train of gears including a gear co-axial with the conjoint film feeding and shutter winding means, a shutter re-set gear, a series of intermediate idler gears, and a measuring sprocket gear, measuring sprocket means driven by said measuring sprocket gear, and a clutch in operative relation to the said measuring sprocket means for disconnecting the latter from the train of gears to permit rewinding of the film, and means associated with said gear train permitting both said curtains to run free upon release without unmeshing any of said gears.

2. In a photographic camera having a two-curtain focal plane shutter and film-strip supporting means, a roller 37 to receive the exposed film in winding, a shaft 58 mounted within said roller, a shutter and film winding knob 1 secured to said shaft and a spring 61 attached at one end to the camera casing and coiled about said shaft 58 to allow said shaft to be turned in one direction only, and a film counter 2 concentrically mounted with respect to said knob and frictionally driven thereby.

3. In a photographic camera having a two-curtain focal plane shutter and film-strip supporting means, a roller to receive the film in winding, a shaft 58 mounted within said roller, a gear 42 keyed upon one end of said shaft and a shutter-and-film-winding knob 1 and film counter 2 concentrically arranged at the other end of said shaft and having frictional engagement with each other, thereby permitting separate rotative movement of said film counter and spring clutching means 61 positioned about said shaft 58 and secured to the camera casing to permit rotation of said shaft 58 in one direction only.

4. In a photographic camera having a two-curtain focal plane shutter including a first curtain having a curtain sheave 89 and a second curtain and film-strip supporting means, a curtain roller composed of a cylindrical member, end disks attached to said cylindrical member and pins 86, 87 oppositely projecting from said end disks respectively for engaging with the shutter operating means, said pin 86 providing means for initially releasing the said second curtain, as for instantaneous or time exposure, and also providing means co-acting with said first curtain sheave 89 for re-winding said second curtain, and said pin 86 and co-acting time-delay means providing means for causing a time delay on retarding of the second curtain, after the said cylindrical member has been initially released.

5. In a photographic camera having a two-curtain focal plane shutter and film-strip supporting means, a train of constantly meshing gears for winding the shutter and feeding the film, said train of gears including a gear 45, a rewind pawl 54 carried by said gear 45, a shutter winding shaft and a slow-shutter-operating cam 56 fast thereon having means to be engaged by said pawl and member 141 of the slow-shutter operating mechanism directly engaging said cam 56.

6. In a photographic camera having a two-curtain focal plane shutter and film-strip supporting means, a roller to receive the film in winding, a shaft 58 mounted within said roller and having a milled end 59, a winding knob 1 received upon said milled end, and having a sleeve portion which when in position is concentrically outside of and spaced from the adjacent end of said shaft 58, a film counter dial 2 also concentrically positioned about said shaft adjacent to said winding knob 2 and having a flexible portion within said sleeve portion of the knob 1 and engaging therewith, and a coiled spring constituting a clutch surrounding said shaft 58 and fast at its ends to the shaft and to the camera casing, whereby the uncoiling of said spring permits the turning of said shaft 58 but the coiling thereof prevents the turning of said shaft.

7. In a photographic camera having a two-curtain focal plane shutter having a first curtain and a second curtain and film-strip supporting means, a curtain roller comprising tubing 83 having end projections 84, disk ends 85 engaging said projections and provided with projecting pins 86, 87, an inner bushing 88 and sheaves 89, 89A coaxially mounted at the ends of said tubing 83, said pin 86 providing means for initially releasing the said second curtain, as for instantaneous or time exposure, and also providing means co-acting with said first curtain sheave 89 for re-winding said second curtain, and said pin 86 and co-acting time-delay means providing means for causing a time delay or retarding of the second curtain, after the said tubing 83 has been initially released.

8. In a photographic camera provided with a casing and having a two-curtain focal plane shutter and film-strip supporting means, a curtain roller, sheaves at the ends thereof, a shaft within said roller having a polygonal portion, and a shutter index plate 95 having a polygonal central opening receiving the polygonal portion of said shaft, said index plate having a series of holes for determining the commencement of movement of the second curtain of the shutter, and stop and retarding pins 99, 100 acting at the running down and winding up respectively of one of said curtains, the shutter setting knob having pin 102, and stop 137 upon the camera casing to be engaged by and thereby to cooperate with said pins 99, 100.

9. In a photographic camera having a two-curtain focal plane shutter and film-strip supporting means, means for making an exposure including a shutter release button 10, a spindle 121 carrying the same, a release member 123 adapted to be moved by said spindle, a rod 124 carrying said release member, and means including a spring about said shaft and a fixed abutment with which a formation of said shaft cooperates, whereby said rod 124 is moved axially as well as turned upon actuation of said release button.

10. In a photographic camera having a two-curtain focal plane shutter and film-strip supporting means, means for making an exposure including a spindle having an exposed part to be pushed by the operator to release the shutter, a co-acting cam finger constituting a release member, a rod 124 carrying said release member, a cam plate 125 also carried by said rod, and cam plate 130 upon a wall of the camera, whereby actuation of said spindle compels rotary and axial movement of said rod 124.

11. In a photographic camera having a two-curtain focal plane shutter and film-strip supporting means, means for making an exposure including a spindle having an exposed part to be pushed by the operator to release the shutter, a co-acting cam finger 123 constituting a release member, a rod 124 carrying said release member, a cam plate 125 also carried by said rod, and cam plate 130 upon a wall of the camera adapted to be engaged by said cam plate 125 and to act as an abutment therefor, and coiled tortional and compression anchored spring 132 surrounding said rod 124 for turning and axially moving the same.

12. In a photographic camera having a two-curtain focal plane shutter and film-strip supporting means, and means for making an exposure including a spindle 121 having an exposed end to be pressed by the operator, a release member positioned to be engaged and moved by pressure on spindle 121, an upright rod carrying said release member, and cam means upon said rod and fixed abutment means engageable therewith, and a tortional spring for said rod to cause rotative movement thereof and opposing axial movement thereof in one direction.

13. In a photographic camera having a two-curtain focal plane shutter and film-strip supporting means, and means for making an exposure including a spindle 121, a release member adapted to be turned thereby upon an inward movement of said spindle, a rod whereon said release member is fast, a cam plate 125 movable with said rod, a cam plate 130 upon a wall of the camera and cooperating with said cam plate 125, and a coiled tortional and compression spring surrounding said rod.

14. In a photographic camera having a two-curtain focal plane shutter and film-strip supporting means, and means for making an exposure including a rod 124 mounted for both axial and rotative movement, a tortional and compression spring 133 coiled about said rod tending to impart such movement to said rod, a train of gearing for effecting feeding of the film and the winding of the shutter, a winding pawl 54 associated with said gearing and adapted to be moved by said rod 124, a curtain roller 83, and a shaft 90 within the same having a shutter shaft cam 56 adapted to be turned by the said winding pawl.

15. In a photographic camera having a two-curtain focal plane shutter and film-strip supporting means, a train of meshing gears for effecting the feeding of the film and the winding of the shutter, a winding pawl carried by one of said gears, a cam plate constituting a slow-shutter operating cam member, it having a formation to be engaged by said winding pawl to move said cam plate, a member 141 of the slow-shutter operating mechanism directly engaging said cam plate, a shaft 90 carrying said cam plate, and curtain roller 83 concentrically positioned with respect to said shaft.

16. In a photographic camera having a two-curtain focal plane shutter and film-strip supporting means, means for making an exposure including an axially movable spindle 121, a pivoted arm distinct from but positioned to be released by axial movement of said spindle, said spindle having holding means thereon for said arm, a latch cooperating with and movable with said arm upon axial movement of the spindle, and a curtain roller 83 having a pin to be engaged by said arm, whereby a curtain is prevented from moving until said latch is released from said pin.

17. In a photographic camera having a two-curtain focal plane shutter and film-strip supporting means, and means for making an exposure including an axially movable spindle 121, a movable arm 136 distinct from said spindle, said spindle having holding means thereon for said arm, and the movement of which arm is controlled by axial movement of said spindle, a pivoted latch 134 movable with said arm, a curtain roller 83 having pin 86 to be engaged by said latch 134, and an index plate having a pin adapted to engage said arm 136.

18. In a photographic camera having a two-curtain focal plane shutter and film-strip supporting means, and means for making an exposure including a spindle 121, an arm 136 and pawl 134 controlled by said spindle, a rod 124, a shutter rewinding pawl 54 adapted to be moved by axial movement of said rod, and a curtain shaft having a slow-shutter-speed cam 56 provided with a formation to be engaged by said pawl 54.

19. In a photographic camera having a casing, a two-curtain focal plane shutter and film-strip supporting means, and means for making an exposure including a curtain roller 83 having a pin 86 for initial release of the second curtain and a pin 87 and co-acting time-delay means for delayed release of such second curtain after said pin 86 has been released, an index plate 95 rotatable with the leading curtain of the said shutter, a pin 102, a shutter speed-setting knob carrying the same, a shutter-release spindle 121, a pivoted arm 136 and pawl 134, the movements whereof are controlled by said spindle, said spindle, said arm and said pawl all being mounted within said casing, said pin 102 being movable with a curtain of said shutter and adapted to engage said arm 136.

20. In a photographic camera having a casing, a two-curtain focal plane shutter and film-strip supporting means, and means for making an exposure including a slow-shutter-operating cam disk 56 of the shutter retarding mechanism within said casing, a curtain shaft mounted in walls of said casing and carrying said cam and a movable arm 141 also within said casing, and adapted to be moved by said operating cam 56 to cause the functioning of the retarding mechanism through said arm 141.

21. In a photographic camera having a casing, a two-curtain focal plane shutter and film-strip supporting means, and means for making an exposure including a curtain roller 83, a shaft therein mounted in walls of said casing and having a slow-shutter operating cam of the shutter retarding means within the casing, a pivoted arm 141 within the casing and engaging said cam to cause the functioning of said retarding means through said arm 141, a conjointly moving second arm 143, and a detent 140 controlled thereby, said curtain roller having a formation to move said detent 140.

22. In a photographic camera having a two-curtain focal plane shutter and film-strip supporting means, and means for making an exposure including a curtain roller 83 having a formation 87, a detent arm 140 adapted to be acted upon by said formation 87, a toothed sector 147 pivotally connected to said detent arm, a cooperating notched wheel 150, and an escapement 151 cooperating therewith.

23. In a photographic camera having a two-curtain focal plane shutter and film-strip supporting means, and means for making an exposure including a curtain roller 83 having a formation 87, a detent 140 adapted to be acted upon by said formation 87, a toothed pivoted sector 147 directly connected to said detent, a cooperating notched wheel 150 having a pinion meshing with said sector, a coacting escapement 151, a lever 153 extending therefrom and an inertia balance 156 coacting with said lever.

24. In a photographic camera having a two-curtain focal plane shutter and film-strip supporting means, and means for making a slow-speed exposure including a curtain roller 83 having a formation, a detent 140 adapted to engage said formation or to be moved clear from such engagement, a sector 147 having an arm 158, said detent having a direct connection with said sector and movable therewith, a coacting adjustable stop pawl 158a mounted in close proximity to said arm 158, and means accessible to the operator for adjusting said pawl with relation to said arm 158.

25. In a photographic camera having a two-curtain focal plane shutter and film-strip supporting means, and means for making an exposure including a curtain roller 53 having a formation 87, a detent 140 to engage the said formation, a sector 147 directly pivotally connected to said detent, an arm 158 carried by said sector and movable with said detent, and a pawl-like member mounted in proximity to said arm and adjustable by the operator so as to have its position with respect to said arm varied for the taking of instantaneous or so-called bulb exposures.

26. In a photographic camera having a two-curtain focal plane shutter and film-strip supporting means, and means for making an exposure including a curtain roller 53 having a formation 87, a detent 140 to engage the said formation, an arm movable with said detent, and a pawl-like member adjustable by the operator so as to have its position with respect to said arm varied for the taking of instantaneous or so-called bulb exposures, and a shaft having a slow-shutter cam 56 and an arm 141 adapted to be moved by said cam 56 to change the position of said detent.

27. In a photographic camera having a two-curtain focal plane shutter and film-strip supporting means, and means for making instantaneous exposures including a curtain roller 83 having a formation 86, an index plate 95 having a series of holes 98, a winding knob having a pin 102 to engage said holes, an arm 136 adapted to be acted upon by said formation 86, a pawl 134 movable with said arm 136, a slow-shutter speed cam 56 and an arm 141 adapted to be acted upon by said speed cam, the construction and relation of parts being such that in the taking of instantaneous exposures the arm 136 is engaged by the formation 86 to release pawl 134 before the slow-shutter speed cam 56 can engage said arm 141.

28. In a photographic camera having a two-curtain focal plane shutter and film-strip supporting means, an objective lens mounted in a wall of the camera substantially centrally between the ends of the camera casing, means for supporting a film magazine and sprocket film feeding means both at one side of said objective lens, a take-up roller for the film and a shutter curtain roller both at the other side of said objective lens, winding means for said take-up roller, and means to maintain tension on the film strip between said measuring sprocket and the said take-up roller, comprising locking means for said sprocket, a one-way clutch for said winding means, and a friction clutch between said take-up spool and said winding means.

29. In a photographic camera having a two-curtain focal plane shutter and film-strip supporting means, an objective lens mounted in a wall of the camera substantially centrally between the ends of the camera casing, means for supporting a film magazine and sprocket film-feeding means both at one side of said objective lens, a take-up roller for the film and a shutter curtain roller both at the other side of said objective lens, winding means for said take-up roller, means to maintain tension on the film strip between said measuring sprocket and the said take-up roller, comprising locking means for said sprocket, a one-way clutch for said winding means, and a friction clutch between said take-up spool and said winding means, and a train of constantly meshing gears extending substantially entirely across the bottom of the camera casing and operatively connected to each of said movable parts to feed the film and to wind the shutter.

30. In a photographic camera having a two-curtain focal plane shutter and film-strip supporting means, an objective lens mounted in a wall of the camera substantially centrally between the ends of the camera casing, means for supporting a film magazine and sprocket film-feeding means both at one side of said objective lens, a take-up roller for the film and a shutter curtain roller both at the other side of said objective lens, winding means for said take-up roller, means to maintain tension on the film strip between said measuring sprocket and the said take-up roller, comprising locking means for said sprocket, a one-way clutch for said winding means, and a friction clutch between said take-up spool and said winding means, and a clutch in operative relation to said measuring sprocket for disconnecting the latter from the gear train to permit rewinding of the film, and a train of constantly meshing gears extending substantially entirely across the bottom of the camera casing to operate said parts, and including gear 42 carried by the film roller, shutter re-setting gear 45, said measuring sprocket gear 31 and idler gears therebetween.

31. In a photographic camera having a two-curtain focal plane shutter and film-strip supporting means, a roller to receive the film in winding, a shaft 58 mounted within said roller and having a milled end 59, a winding knob 1 received upon said milled end, and having a sleeve portion which when in position is concentrically outside of and spaced from the adjacent end of said shaft 58, a film counter dial 2 also concentrically positioned about said shaft adjacent to said winding knob 2 and having a flexible portion within said sleeve portion of the knob 1 and engaging therewith.

EDSON S. HINELINE.